(12) United States Patent
Zenk et al.

(10) Patent No.: US 8,616,654 B2
(45) Date of Patent: Dec. 31, 2013

(54) METHOD AND DEVICE FOR ADJUSTING A SEAT

(75) Inventors: Raphael Zenk, Munich (DE); Matthias Franz, Brannenburg (DE); Alexander Durt, Inning (DE); Rudolf Lein, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/775,637

(22) Filed: May 7, 2010

(65) Prior Publication Data

US 2010/0276973 A1 Nov. 4, 2010

Related U.S. Application Data

(63) Continuation of application No. PCT/EP2008/009376, filed on Nov. 6, 2008.

(30) Foreign Application Priority Data

Nov. 8, 2007 (DE) .......................... 10 2007 053 119

(51) Int. Cl.
*A47C 7/02* (2006.01)
(52) U.S. Cl.
USPC ................. 297/452.41; 297/284.3; 297/284.6
(58) Field of Classification Search
USPC .................................. 297/284.3, 284.6, 452.41
See application file for complete search history.

(56) References Cited

U.S. PATENT DOCUMENTS

| 4,040,655 A | | 8/1977 | Garrick et al. |
| 4,634,083 A | | 1/1987 | McKinnon |
| 4,634,179 A | * | 1/1987 | Hashimoto et al. ........ 297/284.6 |
| 4,655,505 A | | 4/1987 | Kashiwamura et al. |
| 4,833,614 A | * | 5/1989 | Saitoh et al. ..................... 701/49 |
| 4,969,684 A | * | 11/1990 | Zarotti ..................... 297/180.12 |
| 4,981,131 A | * | 1/1991 | Hazard ........................... 601/24 |
| 5,082,326 A | * | 1/1992 | Sekido et al. .............. 297/284.6 |
| 5,127,708 A | * | 7/1992 | Kishi et al. ................. 297/284.1 |
| 5,129,704 A | * | 7/1992 | Kishi et al. ................. 297/284.1 |

(Continued)

FOREIGN PATENT DOCUMENTS

| DE | 29 39 115 C2 | 4/1980 |
| DE | 38 04 848 A1 | 8/1989 |

(Continued)

OTHER PUBLICATIONS

German Search Report dated May 20, 2008 including partial English-language translation (Nine (9) pages).

(Continued)

*Primary Examiner* — David E Allred
(74) *Attorney, Agent, or Firm* — Crowell & Moring LLP

(57) ABSTRACT

A method and a device for adjusting a seat are provided. The method includes the acts of detecting a pressure exerted by a user on the seat via a pneumatic sensor and/or a hydraulic sensor, and adjusting the seat based on the pressure exerted by the user. The device includes a pneumatic or hydraulic lifting element, a pneumatic or hydraulic pressure sensor connected to the lifting element, and a control unit connected to the pressure sensor. The pressure sensor detects a pressure exerted by a user on the seat, and the control unit controls the first lifting element to adjust the seat based on the pressure exerted by the user.

15 Claims, 4 Drawing Sheets

(56) References Cited

U.S. PATENT DOCUMENTS

| | | | |
|---|---|---|---|
| 5,170,364 A * | 12/1992 | Gross et al. | 702/139 |
| 5,263,765 A * | 11/1993 | Nagashima et al. | 297/284.6 |
| 5,320,409 A * | 6/1994 | Katoh et al. | 297/284.6 |
| 5,558,398 A * | 9/1996 | Santos | 297/284.3 |
| 5,587,933 A * | 12/1996 | Gross | 702/139 |
| 5,658,050 A * | 8/1997 | Lorbiecki | 297/452.41 |
| 5,687,099 A * | 11/1997 | Gross et al. | 702/98 |
| 5,765,915 A * | 6/1998 | Lee | 297/344.12 |
| 5,860,699 A * | 1/1999 | Weeks | 297/284.6 |
| 6,014,784 A * | 1/2000 | Taylor et al. | 5/713 |
| 6,088,643 A * | 7/2000 | Long et al. | 701/49 |
| 6,092,249 A * | 7/2000 | Kamen et al. | 5/653 |
| 6,098,000 A * | 8/2000 | Long et al. | 701/49 |
| 6,105,706 A * | 8/2000 | Cooper | 180/282 |
| 6,203,105 B1 * | 3/2001 | Rhodes, Jr. | 297/284.6 |
| 6,299,250 B1 * | 10/2001 | Orizaris et al. | 297/284.6 |
| 6,578,917 B1 * | 6/2003 | Aubert et al. | 297/317 |
| 6,682,059 B1 * | 1/2004 | Daniels et al. | 267/131 |
| 7,727,171 B2 * | 6/2010 | Ozaki et al. | 601/105 |
| 8,275,514 B2 * | 9/2012 | Hwang et al. | 701/36 |
| 8,398,170 B2 * | 3/2013 | Walker | 297/284.3 |
| 2002/0180249 A1 * | 12/2002 | Felton et al. | 297/284.6 |
| 2003/0038517 A1 * | 2/2003 | Moran et al. | 297/284.3 |
| 2005/0127728 A1 * | 6/2005 | Sugiyama et al. | 297/284.3 |
| 2005/0264069 A1 * | 12/2005 | Makhsous et al. | 297/284.1 |
| 2006/0049678 A1 * | 3/2006 | Kern et al. | 297/284.3 |
| 2007/0063560 A1 * | 3/2007 | Swan et al. | 297/284.6 |
| 2008/0174157 A1 * | 7/2008 | Makhsous et al. | 297/217.3 |
| 2009/0099490 A1 * | 4/2009 | Durt et al. | 601/115 |
| 2009/0152916 A1 * | 6/2009 | Lin et al. | 297/217.3 |
| 2010/0004516 A1 * | 1/2010 | Teng et al. | 600/301 |
| 2010/0244504 A1 * | 9/2010 | Colja et al. | 297/180.1 |
| 2012/0086249 A1 * | 4/2012 | Hotary et al. | 297/284.3 |

FOREIGN PATENT DOCUMENTS

| | | | | |
|---|---|---|---|---|
| DE | 196 05 779 A1 | | 7/1996 | |
| DE | 195 22 897 C2 | | 1/1997 | |
| DE | 195 45 168 A1 | | 6/1997 | |
| DE | 197 26 409 A1 | | 12/1998 | |
| DE | 198 51 698 A1 | | 5/2000 | |
| DE | 200 16 770 U1 | | 3/2002 | |
| DE | 101 42 836 B4 | | 12/2004 | |
| DE | 10 2004 062 084 B3 | | 6/2006 | |
| EP | 382663 A1 | * | 8/1990 | A47C 7/46 |
| FR | 2 754 497 A1 | | 4/1998 | |
| GB | 2 033 613 A | | 5/1980 | |
| JP | 59230833 A | * | 12/1984 | B60N 1/06 |
| JP | 04005916 A | * | 1/1992 | A47C 7/14 |
| WO | WO 9408493 A1 | * | 4/1994 | A47C 7/46 |
| WO | WO 2007/121874 A1 | | 11/2007 | |

OTHER PUBLICATIONS

International Search Report dated Jan. 22, 2009 including English-language translation (Four (4) pages).

* cited by examiner

METHOD AND DEVICE FOR ADJUSTING A SEAT

CROSS-REFERENCE TO RELATED APPLICATIONS

This application is a continuation of PCT International Application No. PCT/EP2008/009376, filed Nov. 6, 2008, which claims priority under 35 U.S.C. §119 from German Patent Application No. DE 10 2007 053 119.4, filed Nov. 8, 2007, the entire disclosures of which are herein expressly incorporated by reference.

BACKGROUND AND SUMMARY OF THE INVENTION

The invention relates to a method and a device for adjusting a seat.

DE 10 2004 062 084 B3 relates to a device for automatically adapting a seat to the driver of a motor vehicle, the seat adjustment selected by the driver being detected and compared with stored target values. The actual detected values are adapted to the target values with the aid of components of the seat itself, by configuring these components to rest against the driver or by generating values of at least one person-specific parameter resulting from the action of the driver on the seat components. In doing so, a drive operated by an electric motor causes a seat component to rest against the driver. The electric motors are designed such that they turn off or switch over in the case of a predetermined mechanical resistance.

A disadvantage of the device disclosed in the document cited above is that the suggested measurement involves a high dead time until inferences can be drawn on the body mass of the driver. The mechanical adjustment involves a constant waiting time while the electric motor uses a lot of electricity. Moreover, it is not possible with this approach to determine the load applied by the user to the largely flat surfaces of the seat. Furthermore, the approach of electricity measurement is not precise.

It is the object of the invention to avoid the disadvantages cited above and to particularly specify a possibility of adapting a seat automatically and efficiently to an individual user from ergonomic aspects, the adaptation being carried out rapidly and with the aid of a measuring procedure that does not attract the user's attention.

With the aim of achieving this object, a method is provided for adjusting a seat as a function of a pressure exerted by a user on the seat, the pressure being detected with the aid of at least one pneumatic sensor and/or at least one hydraulic sensor.

In particular, the seat may be adjusted as a function of a pressure ratio determined with the aid of at least two pneumatic or hydraulic sensors.

A pressure distribution on the backrest and/or seating area(s) can thus be determined with the aid of the at least one sensor rapidly and without attracting the user's attention. This pressure distribution can be used for adjusting the seat, such as by drawing a comparison with target values.

In a development of the invention, the seat may include several pneumatic sensors and/or hydraulic sensors, at least one pneumatic sensor being connected to at least one pneumatic lifting element and/or at least one hydraulic sensor being connected to at least one hydraulic lifting element. The at least one sensor may have a fluidic connection to the at least one pneumatic and/or hydraulic lifting element via a line.

The lifting element thus has a dual function in that, on the one hand, it acts corresponding to its main function as an actuator, with the aid of which an actuation is applied to the contact surface of the user with the seat in order to achieve a massaging effect, for example. On the other hand, the lifting element functions as a pressure transducer in that the contact force applied by the user to the seat brings about a change of pressure in the interior of the lifting element. A pressure sensor detects this internal pressure of the lifting element.

The method of the invention as described above can thus be implemented with minimum additional effort since additional pressure transducers, for example, in the form of a sensor mat sewed in the backrest and/or the seat cushion, are not necessary.

In another development of the invention, a predetermined fill level may be assigned to the at least one hydraulic lifting element and/or the at least one pneumatic lifting element before the user exerts pressure on the seat; that is to say, before the user sits down in the seat.

In another development of the invention, a current pressure profile may be determined as a function of the pressure exerted by the user on the seat.

In particular, the pressure profile can correspond to a pressure distribution along the seat region.

In another development of the invention, the current pressure profile may be compared with a predetermined ergonomic pressure profile, and the seat and/or components of the seat is/are adjusted in the direction of the ergonomic pressure profile.

In particular, the seat can be adjusted automatically such that the ergonomic seat profile is achieved. It is also possible to use a closed-loop control system for this purpose, which carries out an iterative adjustment of the seat in the direction of the ergonomic seat profile with the help of the continuously updated data of the sensors.

In particular, a control unit can be provided, with the help of which the data of the sensors can be detected and the lifting elements can be controlled. At least one ergonomic pressure profile may be stored in the control unit.

Furthermore, in another development of the invention, the fill level of the at least one hydraulic lifting element and/or the at least one pneumatic lifting element may be reset upon completion of the seat adjustment. In doing so, the fill level can be reset to a previous value. Alternately, the at least one lifting element can also be emptied completely and/or partly.

In another development of the invention, the seat adjustment may be initiated when entering into a vehicle and/or when opening the vehicle and/or when approaching the motor vehicle.

For example, the seat adjustment can be initiated as early as when activating a remote control for opening the vehicle. It is also possible in combination with a keyless access system to automatically recognize the approximation of the user to his vehicle and accordingly initiate the seat adjustment.

Such an initiation of the seat adjustment advantageously includes the pre-allocation of predetermined pressures to the lifting elements.

In another development of the invention, the seat adjustment may be activated manually or automatically during travel.

In one embodiment of the invention, the seat may be an electrically and/or hydraulically and/or pneumatically adjustable seat.

In doing so, one or more of the following seat parts can be adjusted:
(1) Seat length;
(2) Seat tilt, seat height, backrest inclination;
(3) Upper backrest, seat depth, backrest width;

(4) Lumbar support, lumbar support depth, lumbar support height;

(5) Headrest.

An adjustment of the upper backrest is possible in the case of backrests having a horizontally running bending axis. The seat depth is adjusted by adjusting a thigh support.

In another embodiment of the invention, the headrest of the seat may be adjusted in height and particularly along a longitudinal axis in the driving direction.

The possibilities of adjusting the seat can be retrieved one after the other or in a defined sequence. It is possible, in particular, to combine a group of adjustment possibilities into a common (partial) adjustment. For example, the seat tilt, seat height and backrest inclination (or upper backrest, seat depth, backrest width) can be adjusted together and the required duration or adaption process for adjusting the seat can be reduced on the whole.

For example, the automatic seat adjustment may be carried out as follows:

(1) Seat-height adjustment
(2) Seat-tilt adjustment
(3) Backrest-inclination adjustment
(4) Upper-backrest adjustment This automatic seat adjustment may be preceded by a pre-adjustment of the longitudinal position of the seat by the user or the retrieval of that adjustment in the longitudinal position of the seat that has been stored for an individual user. However, it is naturally also possible for the seat-length adjustment within the aforementioned sequence to be carried out within the scope of the automatic seat adjustment of embodiments of the invention.

A readjustment or correction of the seat position may be carried out using the following parameters:

(5) Seat-tilt adjustment
(6) Backrest-inclination adjustment

If the ergonomic seat profile is not yet achieved upon completion of this sequence, the sequence may be restarted from the first step.

In one embodiment, the pressure may be determined with the aid of at least one additional pressure sensor that is independent of a lifting element. Furthermore, additional sensors of any kind can be provided in the seat or in the vehicle, which additional sensors are consulted for evaluating the seat position and/or the driving condition and thus for adjusting the seat.

In another embodiment of the invention, two sensors may be provided in different, spatially separate regions of the backrest. The sensors thus provide a pair of actual pressure values which is transmitted to the control unit. A quotient is calculated from these two values in the control unit and compared with a value stored in the control unit. The stored value represents that ratio of pressure values that results in the case of a seat that has been adjusted correctly from ergonomic aspects. In the next step, drives, such as electric drives, may adjust the seat according to a predetermined algorithm, for the purpose of an approximation of the quotient of the two measured pressure values (actual quotient) to the stored ideal value (target quotient). The adjustment of the seat is complete when the ideal value is reached. In order to reduce the duration of seat adjustment, it is sufficient in practice to reach the ideal value within a tolerance field.

The two regions of the backrest in which the pressure is detected may be an upper and a lower region of the backrest.

Similarly, a pressure-value quotient can also be determined in two different, spatially separate regions of the seat cushion. The sensors may be disposed in a front and a rear region of the seat cushion.

In another embodiment of the invention, the actual quotients both for the backrest and the seat cushion are determined. As a result, the "vertical" and "horizontal" pressure ratios are measured, and are subsequently made to match with the ideal ergonomic pressure ratios (target quotients) stored in the control unit by a control algorithm in the control unit by adjusting the seat and its components.

By forming a pressure ratio between two different regions in the backrest and/or in the seat cushion, the method of the invention described above can be used irrespective of absolute values for the pressure. The measuring procedure is thus uncoupled from the weight of the user. The user's weight, physique, size, etc. thus no longer play a direct role. It is thus not necessary to store different absolute pressure values in the control unit, which absolute pressure values correspond to an ideal ergonomic adjustment of the seat and its components.

The seat adjustment can be carried out more precisely with the aid of a larger number of pressure transducers and pressure sensors, but a sufficiently accurate seat adjustment is already possible in the case of two sensors in the backrest and in the seat cushion in each case.

The fill pressure in the lifting elements can be reset once the ergonomically correct seat adjustment is reached. This ends the phase in which the lifting elements are used as pressure transducers. The lifting elements can thus also be used again for their actual function.

Lifting elements are usually provided in the right and the left parts of the backrest and/or the seat cushion. In an embodiment of the invention, a common pressure sensor detects the pressure exerted by a user on corresponding lifting elements in the right and left parts of the seat. Experiments have shown that this results in a sufficiently precise seat adjustment which also takes into consideration situations where the user is seated or supported eccentrically in the seat.

The lifting elements are not used for adjusting the seat in the sense of changing the contour of the seat, but only as pressure transducers (for a limited period of time) with the help of whose feedback the seat is brought into its target position by independent actuators, such as electric actuators.

A device for adjusting a seat is also provided. The device includes a control unit that is configured such that the method described herein can be carried out on the control unit.

The aforementioned control unit can include at least a chip, particularly a microprocessor and/or a microcontroller. It can also be at least an Application Specific Integrated Circuit (ASIC) or the like.

The device for adjusting the seat can be an integral component of the seat or it can be formed separately in a centralized control unit.

In particular, an automatic seat comfort adjustment may be provided, which determines a pressure distribution of a user in the seat with the aid of pneumatic sensors particularly in the regions of the seating area and the backrest.

It is of advantage, for example, that massage seats or seats such as the ones described in DE 197 26 409 A1 often have lifting elements which are coupled to pressure sensors in order to rule out overloading or erroneous filling. These pressure sensors can be used as the sensors cited above.

Initially, the lifting elements may be pre-filled. This pre-filling can be carried out automatically as soon as a user approaches the vehicle, opens the vehicle, or opens a door to a seat of the vehicle.

The at least one sensor may register different pressures with the help of the pre-filled lifting elements depending on the size, weight, physique and position of the user sitting down in the seat.

The pressure distribution of the user in the seat can thus be determined. This pressure distribution is compared with a pressure distribution that would be considered as being advantageous from ergonomic aspects. Particularly the pressure distributions of the lifting elements can be set in relation to each other and compared with a previously determined and stored pressure distribution. This comparison delivers a difference that can be compensated for with the aid of the adjustment possibilities of the seat.

For such a seat adjustment, a defined period of time may be predetermined during which the seat is adapted to the previously stored pressure distribution. The adjustment or adaption may conclude with the lapse of this period. Alternately, the adaption to the seat position of the user can be carried out regularly or continuously. An adapted ergonomic adjustment can be rapidly found for the user particularly in the case of a change in the position of the seat.

Optionally, the seat adjustment can be started automatically or manually, for example, when driving for a long period of time.

Embodiments of the invention will be explained in more detail below.

In the use of seats having a plurality of adjustment possibilities, the user often finds it difficult to cope with the process of finding the correct or suitable seat adjustment. Furthermore, it may happen that a seat position that the user initially finds comfortable turns out to be uncomfortable or un-ergonomic after an extended period of sitting in the seat.

Embodiments of the invention enable the automatic adjustment of a seat position that is ergonomic for the user of the seat without requiring the user to know or learn the adjustment possibilities of the seat. Likewise, the user need not know the seat position that would be advantageous from ergonomic aspects.

It is thus possible to automatically adjust a seat position for the user which enables high level of seat comfort over a long period of time.

The adjustment of the seat as a function of the measurement of pressure exerted by a user on the seat with the load distribution derived therefrom is associated with a high level of comfort for the user.

The time taken for adjusting the seat is short particularly due to the high sensitivity of the filled lifting elements that enable rapid detection of the pressure distribution.

The approach presented here further enables a complete adjustment of the seat over a plurality of percentiles and anthropometries.

The functionality described can be used globally for different body shapes, and particularly also in cases where the driver's spinal column is deformed due to old age or illness.

The seat position can particularly be adjusted based on a tissue-pressure distribution that would be considered as optimum from medical and ergonomic points of view.

Apart from the automatic adjustment described above for achieving a permanently comfortable and advantageous seat position in terms of ergonomics and driving safety, the user also has the option of manually changing the seat adjustment.

Seats for carrying out the method of the invention are suitable for use in any kind of vehicle, particularly in a motor vehicle. The seat can be a driver seat, front passenger seat or any other passenger seat.

Other objects, advantages, and novel features of the present invention will become apparent from the following detailed description of one or more exemplary embodiments when considered in conjunction with the accompanying drawings.

DETAILED DESCRIPTION OF THE DRAWINGS

Figure 1:
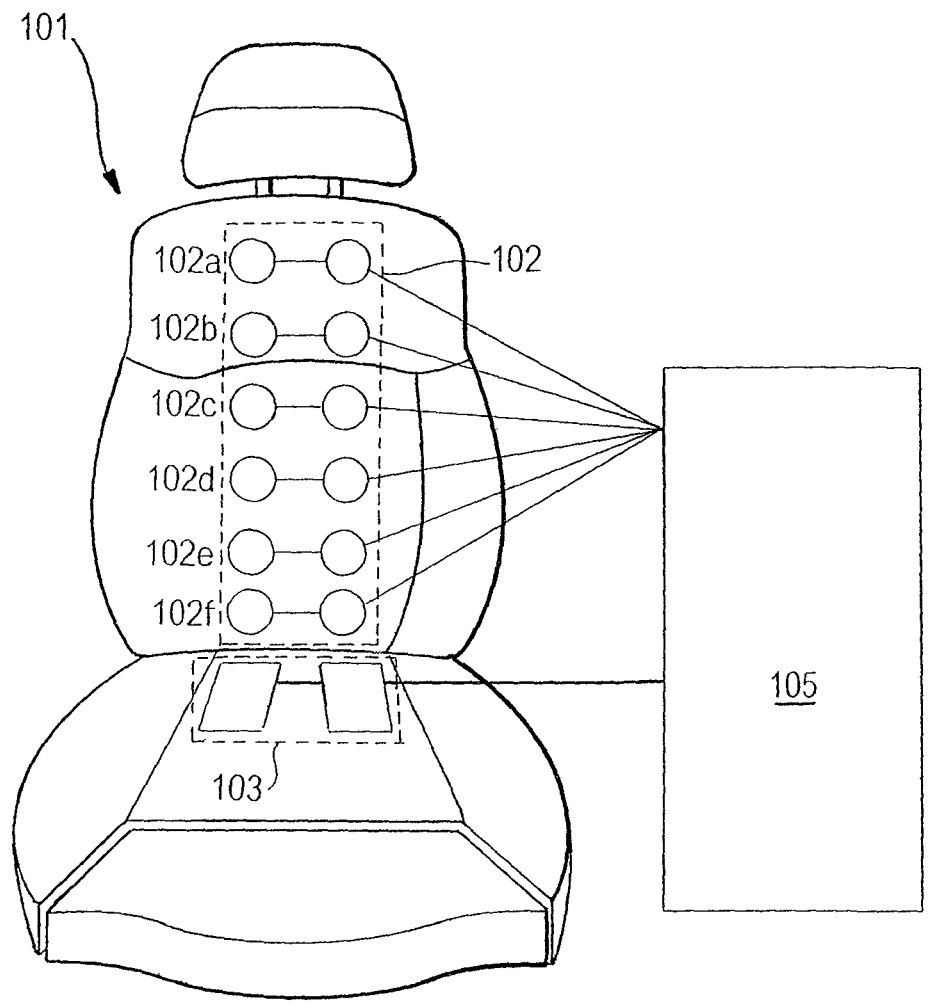
FIG. 1 shows a related art vehicle seat.

FIG. 1 shows a vehicle seat which is marked in its entirety with reference numeral 101 and is disclosed in WO 2007/121874 A1 by way of example. The seat 101 includes pneumatic lifting elements 102 disposed in the backrest preferably below the seat cover. By way of example, twelve pneumatic lifting elements 102a to 102f are provided, in pairs, in the backrest of the seat 101 in FIG. 1. The lifting elements 102a to 102f are formed as massaging devices.

Two lifting elements 103 that bring about a mobilization of the user's spinal column are provided in the seating area of the seat 101, preferably below the seat cover in the region of the user's sitting bones (tuber ischii).

A control unit 105 controls the lifting elements 102a to 102f and 103.

Figure 2:
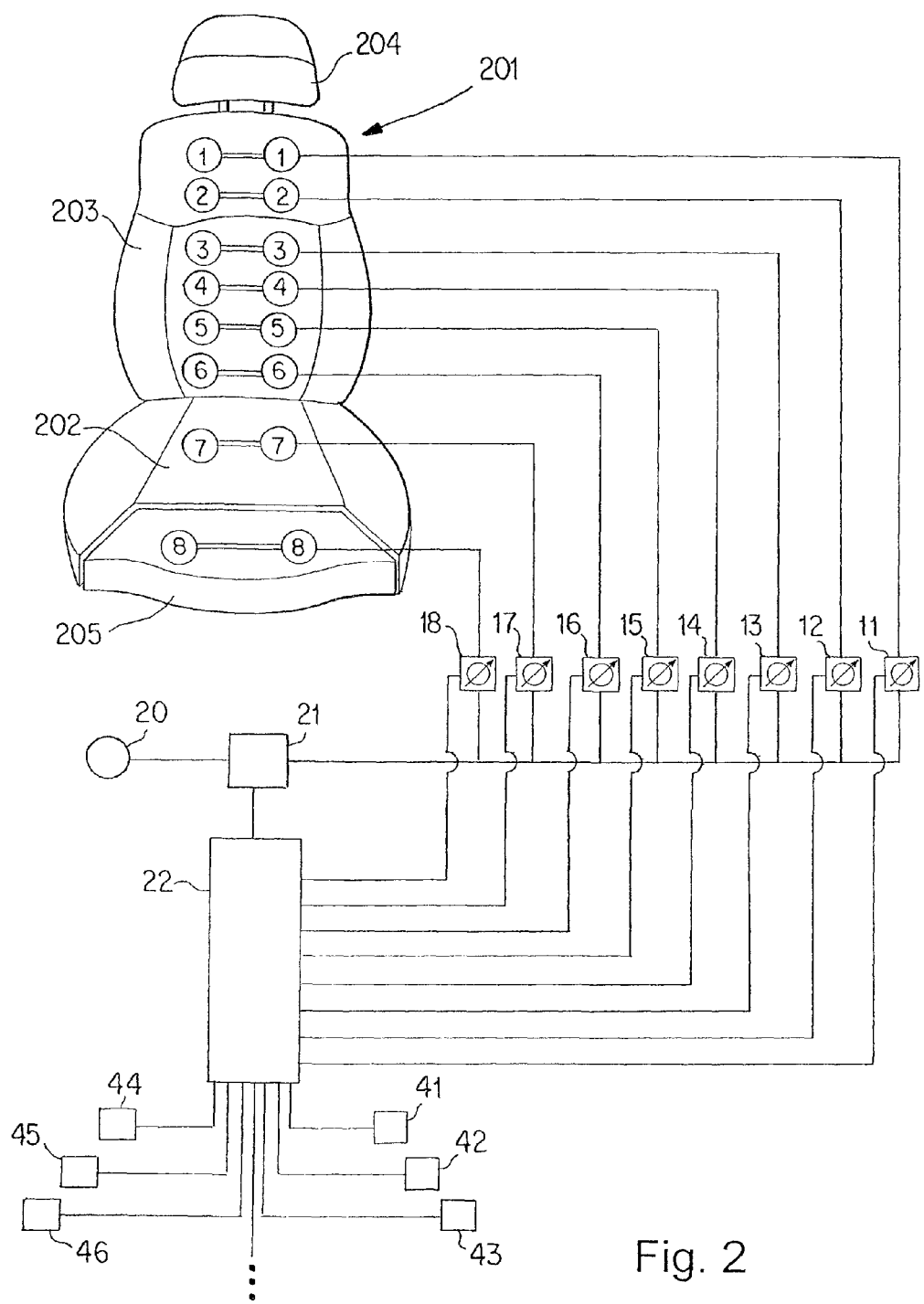
FIG. 2 shows a vehicle seat according to a first embodiment of the invention.

FIG. 2 shows a seat according to a first embodiment of the invention. The seat 201 includes a seat cushion 202, a backrest 203, a headrest 204, and a thigh support 205 as part of the seat cushion 202. Six pairs of lifting elements 1 to 6 are disposed above one another in the backrest 203. Two pairs of lifting elements 7 and 8 are provided in the seat cushion 202. The lifting elements 1 to 6 are used for massaging purposes while the lifting elements 7 are used for the mobilization of the spinal column. In this respect, the structure of the seat 201 corresponds to the related art seat shown in FIG. 1. Furthermore, the lifting elements 8 are provided for massaging purposes in the thigh support.

A pneumatic pump 20 acts by way of a valve 21 on the pairs of lifting elements 1 to 8 with the interposition of pressure sensors 11 to 18. The pressure sensors 11 to 18 each additionally have a throttle function for regulating the pressure in the pairs of lifting elements 1 to 8.

The pressure sensors 11 to 18 are connected to a control unit 22 with the aid of electrical lines. The control unit 22 acts on the throttles in the pressure sensors 11 to 18 and thus controls the lift of the lifting-element pairs 1 to 8.

According to exemplary embodiments of the invention, the control unit 22 is formed such that it performs the following functions:

(1) Applying a primary pressure of approximately 80 mbar, for example, to the lifting elements 1 to 8 and consequently blocking the throttles in the pressure sensors 11 to 18 so that the primary pressure in the lifting elements 1 to 8 is retained.

(2) Measuring the pressure resulting in the individual lifting-element pairs 1 to 8 after a user sits down in the seat.

(3) Comparing the measured pressure values (actual values) with the ideal values (target values), which are stored in the control unit 22 and which represent an ergonomic seat adjustment, for example, at a clock frequency of about 5 Hz.

(4) Controlling seat-adjustment drives 41 to 46 (for adjusting the entire seat 201, the seat cushion 202, the backrest 203, the headrest 204, the thigh support 205, the side bolsters, the lumbar support, etc.) according to a predetermined algorithm.

(5) Detecting the pressure values on the pressure sensors 11 to 18 during the control of the seat-adjustment drives 41 to 46 and comparing the measured pressure values with the stored ideal values.

(6) Representing a closed-loop control system, by which the seat-adjustment units 41 to 46 are controlled, so that the values detected by the pressure sensors 11 to 18 approximate the stored ideal values (optionally within a predetermined range of tolerance).

For example, the adjustment of the seat 201 disposed behind the vehicle door can be initiated when opening this door via a door contact switch. The pneumatic lifting elements 1 to 8 are filled with a pressure of approximately 50 mbar to 100 mbar. A period of approximately 0.5 seconds to 3 seconds is provided for this purpose (Phase 1).

The user then sits down in the seat 201 and generates a pressure change in the pre-filled lifting elements 1 to 8 by virtue of his weight, his height, and his anatomical and physiological characteristics. This pressure change is registered (Phase 2) with the aid of the pressure sensors 11 to 18. It is of particular advantage here that the pre-filling of the lifting elements 1 to 8 makes the pressure sensors 11 to 18 connected to the lifting elements 1 to 8 very sensitive to pressure changes; that is to say, the pressure distribution of the user can be determined rapidly and with high degree of precision.

The control unit 22 is thus used to fill the lifting elements 1 to 8 on the one hand and to subsequently register pressure changes with the aid of the pressure sensors 11 to 18 on the other hand. The control unit 22 further includes a memory containing at least one profile or ratio for an ergonomic pressure distribution. It is possible, in particular, to store several such profiles or ratios in the memory as a function of certain physiological parameters or operational profiles.

Preferably, it is not the measured absolute pressures on the pressure sensors 11 to 18 but the quotients of the measured pressures on the lifting-element pairs 1 to 8 that are consulted for the automatic seat adjustment. These quotients of the measured values are compared with ideal quotients that represent an ergonomic seat adjustment. This starts a closed-loop control process which ends only when the quotients of the measured values match the stored quotients, at least within a predetermined range of tolerance.

In detail, the pressure change occurring when the user sits down in the seat is registered by the control unit 22 by comparison with the primary pressure, and a pressure distribution of the user generated by the sitting process is thus determined. If this pressure distribution deviates from a predetermined (e.g., ergonomic) pressure distribution, the control unit 22 carries out an adjustment (e.g., by a closed-loop control process) in Phase 3 in order to achieve a pressure distribution in a predetermined period of time, which pressure distribution most closely approximates the predetermined parameters (target specification according to the memory).

The seat 201 may be an electrically, hydraulically and/or pneumatically adjustable seat. For example, the seat has the following adjustment possibilities:

(1) Seat-length adjustment;
(2) Seat-tilt adjustment;
(3) Seat-height adjustment;
(4) Backrest-inclination adjustment;
(5) Upper-backrest adjustment;
(6) Seat-depth adjustment;
(7) Backrest-width adjustment;
(8) Headrest adjustment in height and in the longitudinal direction (driving direction); and
(9) Adjustment of a lumbar support, e.g., a lumbar-support depth and/or a lumbar-support height.

The control unit 22 triggers the adjustment of the seat 201 so that an ergonomic pressure distribution in accordance with a stored profile can be achieved for the user with the aid of the adjustment possibilities cited above.

It is possible, in particular, to move the seat 201 in advance based on the adjustment possibilities into a predetermined position starting from which an additional adaptation to the individual parameters of the user no longer requires excessive adjustments of the seat 201. A previously stored seat position can be retrieved as soon as the doors of the vehicle are opened, for example.

After the user has sat down in the seat 201, the seat can be adjusted incrementally according to the following weighting:

(1) Seat-length adjustment;
(2) Seat-tilt adjustment, seat-height adjustment, backrest-inclination adjustment;
(3) Upper-backrest adjustment, seat-depth adjustment, backrest-width adjustment;
(4) Headrest adjustment in height and in the longitudinal direction (driving direction);
(5) Adjustment of a lumbar support.

At least two to five iterations can be provided for the closed-loop control process, and these iterations can be carried out in a period of approximately 3 to 9 seconds.

The adjustment ends upon the lapse of the predetermined period of time, when the lifting elements 1 to 8 may be at least partly emptied (see Phase 4) and the ergonomic seat position is achieved.

Phases 1 to 4 described above are shown in FIG. 4 for the lifting elements 1 to 8 of the seat 201 in the form of pressure courses for each lifting element 1 to 8.

Figure 4:
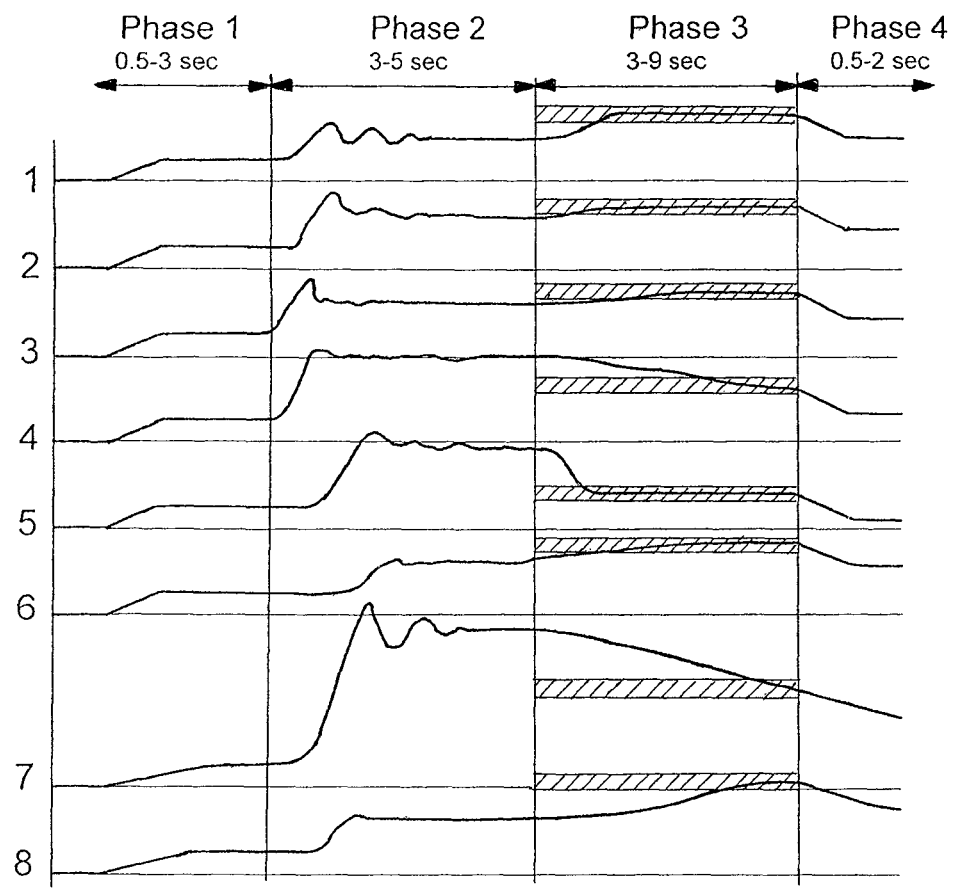
FIG. 4 shows a graph including pressure courses on pressure sensors during various phases for adjusting a pressure distribution for achieving an ergonomic seat position for a user.

During Phase 1 the lifting elements 1 to 8 are filled over a period of time of 0.5 seconds to 3 seconds. Phase 2 corresponds to the act of the user sitting down in the seat. A period of 3 seconds to 5 seconds can be scheduled for the same. In Phase 3, the seat 201 is adjusted such that an ergonomic pressure distribution (in accordance with a stored pressure profile) is achieved for the user. In this respect FIG. 4 shows hatched regions which are to be achieved by adjusting the seat 201 as far as possible (predetermined target pressure values for the respective seat region). This adjustment can last from 3 seconds to 9 seconds. Upon completion of the adjustment, the lifting elements 1 to 8 are at least partly emptied in Phase 4 or adjusted to another predetermined pressure. This process may take 0.5 seconds to 2 seconds.

It should be noted here that the lifting elements 1 to 8 cited above are formed as pneumatically controllable bubbles and/or as hydraulic containers that can be filled and emptied. The possibility of using lifting elements 1 to 8 already existing in the seat 201 is of particular advantage here.

A repeat adjustment of the seat 201 to the predetermined ergonomic seat position can additionally be carried out via manual activation by a user (as needed); after the vehicle is locked or after the vehicle doors are opened again; after the lapse of a predetermined period of time; and/or after a change in the driving mode (e.g., from comfort to sport mode).

It is possible, in particular, to store several profiles (pressure distributions). The ergonomically advantageous seat position for a comfort or sport mode can be achieved depending on a pre-adjustment, the vehicle type, or a selection made by the driver. For example, it is possible for purposes of a sport mode, for the seat 201 to provide the user with a stronger lateral support.

Figure 3:
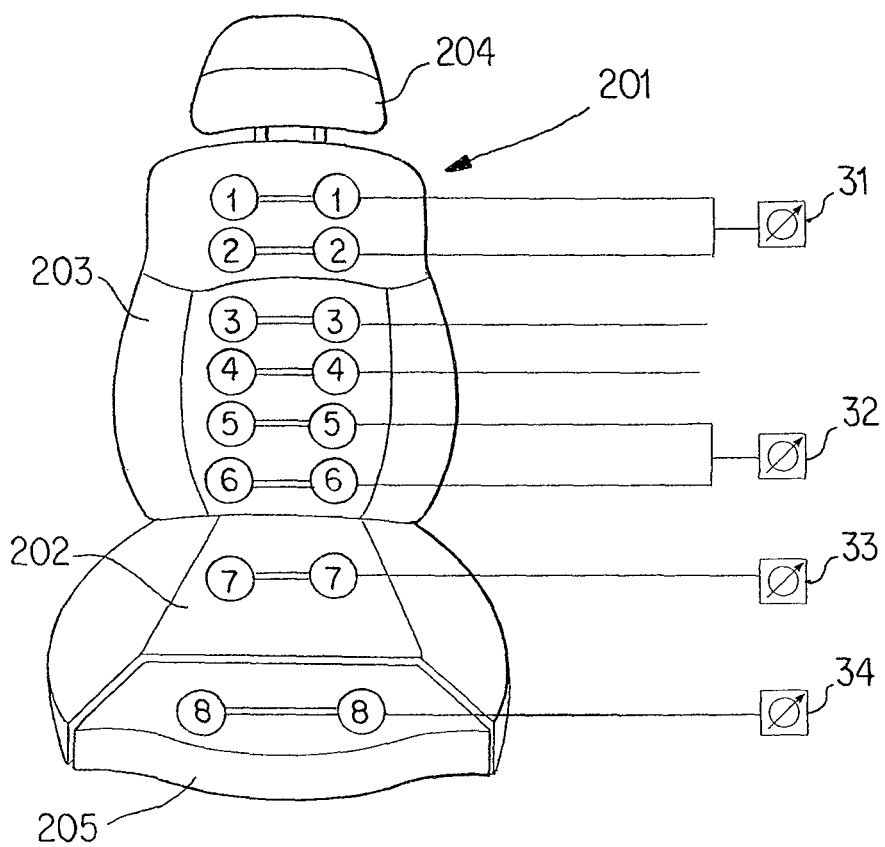
FIG. 3 shows a vehicle seat according to a second embodiment of the invention.

In a second embodiment of the invention shown in FIG. 3, the number of sensors is reduced. Two sensors 31 and 32 are provided here which are assigned to the lifting-element pairs 1, 2 and the lifting-element pairs 5, 6 respectively. The contact pressure applied by a user to the seat 201 is thus detected in two spatially separate regions of the backrest 203. By combining the two uppermost lifting-element pairs 1, 2 and the two lowermost lifting-element pairs 5, 6, an average pressure is determined in the upper and lower regions of the backrest 203. Similarly, sensors 33 and 34 are assigned to the lifting-element pairs 7, 8 in the seat cushion 202 respectively, as a result of which the pressure applied by a user to the rear and front regions of the seat cushion 202 can be detected.

Before a user sits down in the seat, a predetermined fill pressure ("primary pressure") is applied to the lifting elements 1 to 8. When the user sits down in the seat, his back rests against the backrest 203 and thus against the lifting elements 1 to 6 and changes the pressure in each of the lifting elements 1 to 6. The two sensors 31 and 32 detect the pressure as an average value of the pressures of the four upper lifting elements 1, 2 and the four lower lifting elements 5, 6. The sensors 31 and 32 thus provide two pressure values that can be transmitted to the control unit 22. A quotient is calculated from these two values for the cumulative pressure in the upper and lower thirds of the backrest 203. This quotient is compared with a value stored in the control unit 22. The stored value represents that ratio of pressure values of the upper third to the lower third of the backrest that results when the seat 201 has been adjusted correctly from an ergonomic point of view.

Similarly, a quotient is calculated from the pressure determined by the sensors 33 and 34 in the rear and front half of the seat cushion 202 by the control unit 22 and compared with an ideal value for an ergonomic seat position stored in the control unit 22.

In the next step, the seat 201 may be adjusted by electric drives according to a predetermined algorithm so that the quotients for the pressure distribution in the backrest 203 and the seat cushion 202 approximate those ideal values of these quotients that are stored in the control unit 22. The adjustment of the seat 201 is completed when the ideal values are reached.

The fill pressure in the lifting elements 1 to 8 can now be discharged. This ends the phase in which the lifting elements 1 to 8 are used as pressure transducers. The lifting elements 1 to 8 can thus be used for their actual massaging function and/or mobilization of the spinal column.

A suitable valve control system (not shown in FIGS. 2 and 3) can be provided for achieving both functions "pressure detection for automatic seat adjustment" and "massage and/or mobilization." For example, for controlling the lifting elements 1 to 8 for "massage and/or mobilization purposes," at least one rotary slide valve can be provided which includes additional bores in the rotary slide for achieving the function "pressure detection for automatic seat adjustment." The two functions cited above cannot be carried out simultaneously but only alternately.

Naturally, the massage and/or mobilization function can be interrupted in a predetermined rotation cycle and/or at the user's request and/or in the case of changed driving conditions in order to again measure the pressure in the two regions of the backrest 203 and the seat cushion 202 and readjust the position of the seat 201.

The pressure ratios resulting on the lifting-element pairs 3 and 4 in the central region of the backrest 203 are insignificant in the majority of cases for the method described above so that a detection of the contact pressure of the user by the two uppermost lifting-element pairs 1, 2 and the two lowermost lifting-element pairs 5, 6 is sufficient for a precise automatic adjustment of the seat 201.

Just as the lifting elements 1 to 6 in the backrest 203, the lifting elements 7 and 8 in the seat cushion 202 can be formed as devices for achieving a massaging effect. The lifting-element pair 7 may be provided for achieving a mobilization of the spinal column, as disclosed in DE 197 26 409 A1 and WO 2007/121874 A1. But it is naturally also possible to bring about a mobilization of the spinal column with the aid of the lifting elements 1 to 6 in the backrest 203.

In order to be able to carry out the method of the invention as described above in a seat 201 including lifting elements 1 to 8 (for example, for massage and/or mobilization purposes), a corresponding number of pressure sensors 11 to 18 and 31 to 34 is necessary for detecting the pressure values, and so is the storage of target values in the control unit 22 with an associated algorithm for adjusting the seat 201. The result is a completely new functionality of the seat 201 with minimum additional expenditure.

To sum up, an exemplary embodiment of the invention can be described as follows:

In a method for automatically adjusting a seat 201, lifting elements 1 to 8 are used as pressure transducers, which are designed for applying actuation to the contact surface of a user with the seat 201. The lifting elements 1 to 8 are connected to sensors 11 to 18 and 31 to 34 that detect the pressure on the lifting elements 1 to 8. After the user has sat down in the seat 201, the sensors 11 to 18 and 31 to 34 measure the pressure on the lifting elements 1 to 8 resulting from the action of the user on the seat 201. These detected actual pressure values are compared with target pressure values stored in a control unit 22. The target pressure values represent a pressure distribution that results in the case of an ergonomically ideal adjustment of the seat 201 and/or its components. With the aid of a control algorithm in the control unit 22, the seat 201 and/or at least a component of the seat 201 is adjusted such that the actual pressure values approximate the target pressure values.

At least two lifting-elements 1 to 8 and two sensors 11 to 18 and 31 to 34 may be provided for the method. At least two lifting elements 1 to 8 and two sensors 11 to 18 and 31 to 34 may each be provided in different regions of both the backrest 203 and the seat cushion 202.

In an embodiment of the invention, the quotient of the actual pressure values is determined, which result from at least two lifting elements 1 to 8 after a user has sat down in the seat 201, the lifting elements 1 to 8 being placed in different regions of the seat 201. The seat 201 and/or at least one component of the seat 201 is then adjusted in such a way by a control unit 22 (with stored quotients of target pressure values representing an ergonomic seat adjustment) that the quotient(s) of the actual pressure values approximate(s) the quotient(s) of the target pressure values.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adjusting a seat of a vehicle, wherein the seat comprises two sensors that detect pressure exerted by a user on a backrest of the seat, in spatially separate regions of the backrest, the method comprising the acts of:
   detecting a first pressure by a first one of the two sensors for the backrest,
   detecting a second pressure by a second one of the two sensors for the backrest,
   calculating a first pressure ratio of the first pressure to the second pressure, comparing the first pressure ratio with a first predetermined ergonomic pressure ratio, and adjusting, via an electric drive, a position of the seat with respect to the vehicle based on the comparing of the first pressure ratio with the first predetermined ergonomic ratio, wherein:

the acts are repeated until the first pressure ratio is within a predetermined range of tolerance of the first predetermined ergonomic pressure ratio, the first pressure is an average of pressures exerted by the user on at least a first position and a second position within an upper region of the backrest, wherein the first position is spatially separated from the second position, and the second pressure is an average of pressures exerted by the user on at least a third position and a fourth position within a lower region of the backrest, wherein the third position is spatially separated from the fourth position.

2. The method according to claim 1, wherein:

the sensors include at least one of a pneumatic sensor or a hydraulic sensor, the pneumatic sensor is connected to at least one pneumatic lifting element, and the hydraulic sensor is connected to at least one hydraulic lifting element.

3. The method according to claim 2, further comprising the act of:

assigning a predetermined fill level to at least one of the hydraulic lifting element or the pneumatic lifting element before the user exerts the pressure on the seat.

4. The method according to claim 3, further comprising the act of:

determining a current pressure profile as a function of the pressure exerted by the user on the seat.

5. The method according to claim 4, further comprising the acts of:

comparing the current pressure profile with a predetermined ergonomic pressure profile, and adjusting the position of the seat in the direction of the ergonomic pressure profile.

6. The method according to claim 1, wherein the method is initiated upon at least one of entering into a vehicle, opening the vehicle, and approaching the vehicle.

7. The method according to claim 1, wherein the method is activated manually or automatically during travel.

8. The method according to claim 1, wherein the seat is adjustable at least one of electrically, hydraulically, or pneumatically.

9. The method according to claim 1, wherein the adjusting of the position of the seat comprises the act of adjusting at least one of a seat length, a seat tilt, a seat height, a backrest inclination, an upper backrest, a seat depth, a backrest width, a lumbar support, a lumbar support depth, a lumbar support height, and a headrest.

10. The method according to claim 1, wherein a common sensor is assigned to a first lifting element in a right part and a second lifting element in a left part of at least one of a backrest and a bottom cushion.

11. The method according to claim 1, wherein the act of adjusting the position of the seat comprises adjusting a position of at least a portion of a frame of the seat with respect to the vehicle.

12. The method according to claim 1, further comprising the acts of:

detecting a third pressure by a first one of two additional sensors that detect pressure exerted by the user on a bottom cushion of the seat, in spatially separate regions of the bottom cushion, detecting a fourth pressure by a second one of the two additional sensors for the bottom cushion, calculating a second pressure ratio of the third pressure to the fourth pressure, and comparing the second pressure ratio with a second predetermined ergonomic pressure ratio, wherein:

the position of the seat is adjusted based on the comparing of the first pressure ratio with the first predetermined ergonomic ratio and the comparing of the second pressure ratio with the second predetermined ergonomic ratio, the acts are repeated until the first and second pressure ratios are within a predetermined range of tolerance of the first and second predetermined ergonomic pressure ratios, respectively, the third pressure is an average of pressures exerted by the user on a front region of the bottom cushion, and the fourth pressure is an average of pressures exerted by the user on a rear region of the bottom cushion.

13. A device for adjusting a seat of a vehicle, the device comprising:

a first sensor that detects a first pressure exerted by a user on an upper region of the backrest, a second sensor that detects a second pressure exerted by the user on a lower region of the backrest, a control unit connected to each of the sensors, and an electric drive connected to the control unit, wherein:

the control unit calculates a first pressure ratio of the first pressure to the second pressure, the control unit compares the first pressure ratio with a first predetermined ergonomic pressure ratio, the control unit controls the electric drive to adjust a position of the seat with respect to the vehicle until the first pressure ratio is within a predetermined range of tolerance of the first predetermined ergonomic pressure ratio, the first pressure is an average of pressures exerted by the user on at least a first position and a second position within the upper region of the backrest, wherein the first position is spatially separated from the second position, and the second pressure is an average of pressures exerted by the user on at least a third position and a fourth position within the lower region of the backrest, wherein the third position is spatially separated from the fourth position.

14. The device according to claim 13, wherein the control unit controls the electric drive to adjust a position of at least a portion of a frame of the seat with respect to the vehicle.

15. The device according to claim 13, further comprising:

a third sensor that detects a third pressure exerted by the user on a front region of the bottom cushion, and a fourth sensor that detects a fourth pressure exerted by the user on a rear region of the bottom cushion, wherein:

the control unit calculates a second pressure ratio of the third pressure to the fourth pressure, the control unit compares the second pressure ratio with a second predetermined ergonomic pressure ratio, the control unit controls the electric drive to adjust the position of the seat with respect to the vehicle until the first and second pressure ratios are within a predetermined range of tolerance of the first and second predetermined ergonomic pressure ratios, respectively, the third pressure is an average of pressures exerted by the user on the front region of the bottom cushion, and
the fourth pressure is an average of pressures exerted by the user on the rear region of the bottom cushion.

* * * * *